(12) United States Patent
Xu et al.

(10) Patent No.: US 12,321,300 B2
(45) Date of Patent: Jun. 3, 2025

(54) APPARATUS AND METHODS FOR TRANSLATING TRANSACTIONS BETWEEN ONE OR MORE REQUESTING UNITS AND A TARGET UNIT

(71) Applicants: ADVANCED MICRO DEVICES, INC., Santa Clara, CA (US); ATI TECHNOLOGIES ULC, Markham (CA)

(72) Inventors: Buheng Xu, Beijing (CN); Xiao Han, Suzhou (CN); Philip Ng, Markham (CA); Shiwu Yang, Suzhou (CN)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/345,992

(22) Filed: Jun. 30, 2023

(65) Prior Publication Data

US 2025/0004974 A1  Jan. 2, 2025

(51) Int. Cl.
*G06F 13/42*  (2006.01)

(52) U.S. Cl.
CPC .......... *G06F 13/42* (2013.01); *G06F 2213/40* (2013.01)

(58) Field of Classification Search
CPC ....................................................... G06F 13/42
USPC ........................................................ 710/105
See application file for complete search history.

(56) References Cited

U.S. PATENT DOCUMENTS

| | | | | |
|---|---|---|---|---|
| 4,914,577 A | * | 4/1990 | Stewart | G06F 12/1036 711/E12.065 |
| 5,475,858 A | * | 12/1995 | Gupta | G06F 15/17 711/149 |
| 5,644,571 A | * | 7/1997 | Seaman | H04L 12/4625 370/401 |
| 5,784,064 A | * | 7/1998 | Penna | G06T 15/405 358/448 |
| 5,822,785 A | * | 10/1998 | Ikeda | G06F 12/1475 711/E12.066 |
| 6,028,984 A | * | 2/2000 | Kimball | G06F 13/385 370/408 |
| 6,079,013 A | * | 6/2000 | Webb | G06F 9/3017 712/230 |
| 6,247,102 B1 | * | 6/2001 | Chin | G06F 13/1642 711/126 |
| 6,272,584 B1 | * | 8/2001 | Stancil | G06F 13/362 710/36 |

(Continued)

*Primary Examiner* — Paul R. Myers

(57) ABSTRACT

An apparatus translates transaction requests using a bus protocol translation lookup table (LUT) that comprises bus protocol translation data. A bus protocol translation controller generates the outgoing translated transaction request by translating the incoming transaction request using the bus protocol translation data from the bus protocol translation LUT. The controller translates a received response from the target unit to a response in a first bus protocol for a corresponding requesting unit. Associated methods are also presented. In some examples, the bus protocol translation data corresponds to each of a plurality of requesting units for translating between an incoming transaction request sent via a first bus protocol to an outgoing translated transaction request sent via a second bus protocol for the at least one target unit.

20 Claims, 10 Drawing Sheets

(56) References Cited

U.S. PATENT DOCUMENTS

| | | | | |
|---|---|---|---|---|
| 6,574,330 B1* | 6/2003 | Baker | H04M 3/523 | |
| | | | 379/265.01 | |
| 7,203,780 B2* | 4/2007 | Asano | G06F 13/4221 | |
| | | | 710/110 | |
| 9,182,984 B2* | 11/2015 | Greiner | G06F 12/1009 | |
| 9,208,120 B2* | 12/2015 | Chirca | G06F 13/30 | |
| 10,019,546 B1* | 7/2018 | Stoler | G06F 30/39 | |
| 10,996,789 B1* | 5/2021 | Lin | G06F 8/65 | |
| 2001/0036823 A1* | 11/2001 | Van Lieshout | H04W 36/10 | |
| | | | 455/418 | |
| 2004/0024943 A1* | 2/2004 | Lupien, Jr. | G06F 13/404 | |
| | | | 710/305 | |
| 2004/0103906 A1* | 6/2004 | Schulman | A61B 5/07 | |
| | | | 128/899 | |
| 2005/0147109 A1* | 7/2005 | Marce | H04L 69/08 | |
| | | | 370/466 | |
| 2006/0106976 A1* | 5/2006 | Michael | H04L 12/2854 | |
| | | | 711/E12.027 | |
| 2008/0250216 A1* | 10/2008 | Kershaw | G06F 9/30192 | |
| | | | 712/205 | |
| 2009/0319707 A1* | 12/2009 | Laycock | G06F 13/4221 | |
| | | | 710/110 | |
| 2011/0078692 A1* | 3/2011 | Nickolls | G06F 9/30087 | |
| | | | 718/103 | |
| 2011/0246841 A1* | 10/2011 | Honda | G11C 16/10 | |
| | | | 714/721 | |
| 2012/0026039 A1* | 2/2012 | Ganeshan | G01S 19/37 | |
| | | | 342/357.73 | |
| 2014/0372699 A1* | 12/2014 | Desai | G06F 12/0802 | |
| | | | 711/118 | |
| 2016/0285420 A1* | 9/2016 | Jones | H01L 23/66 | |
| 2017/0153952 A1* | 6/2017 | Tsirkin | H04L 61/2575 | |
| 2017/0255579 A1* | 9/2017 | Ngo | G06F 13/364 | |
| 2019/0163573 A1* | 5/2019 | Chen | G06F 11/1438 | |
| 2024/0054094 A1* | 2/2024 | Tran | G06F 13/4295 | |

* cited by examiner

FIG. 6

| Entry Index 206 | Valid (600) | ReqUnitID (602) | Is_PCIE_func (604) | DEV (606) | FUNC (608) | Resp. Status Data Exok value (610) | Resp. Status Data Resp value (612) |
|---|---|---|---|---|---|---|---|
| 0x0 | 1 | 0x000 | 0 | 0 | 0 | 0 | 0 |
| 0x1 | 0 | 0 | 0 | 0 | 0 | 0 | 0 |
| 0x2 | 0 | 0 | 0 | 0 | 0 | 0 | 0 |
| 0x3 | 0 | 0 | 0 | 0 | 0 | 0 | 0 |
| 0x4 | 1 | 0x001 | 1 | 0 | 0 | 1 | 1 |
| 0x5 | 1 | 0x005 | 0 | 0 | 0 | 0 | 3 |
| 0x6 | 0 | 0 | 0 | 0 | 0 | 0 | 0 |
| 0x7 | 0 | 0 | 0 | 0 | 0 | 0 | 0 |
| 0x8 | 1 | 0x002 | 1 | 1 | 1 | 0 | 0 |
| 0x9 | 0 | 0 | 0 | 0 | 0 | 0 | 0 |
| 0xa | 0 | 0 | 0 | 0 | 0 | 0 | 0 |
| 0xb | 0 | 0 | 0 | 0 | 0 | 0 | 0 |
| 0xc | 1 | 0x003 | 1 | 0 | 2 | 1 | 0 |
| 0xd | 1 | 0x007 | 1 | 0 | 3 | 3 | 0 |
| 0xe | 0 | 0 | 0 | 0 | 0 | 0 | 0 |
| 0xf | 0 | 0 | 0 | 0 | 0 | 0 | 0 |

APPARATUS AND METHODS FOR TRANSLATING TRANSACTIONS BETWEEN ONE OR MORE REQUESTING UNITS AND A TARGET UNIT

BACKGROUND OF THE DISCLOSURE

In computing systems, such as cloud servers, machine learning systems or other computing systems, interface logic is circuitry that is used between one or more requesting units, including peripheral input/output (I/O) clients and/or data path hubs and a host processor. For example, for each requesting unit that communicates with the host processor, the interface logic translates outstanding transactions, and in some cases performs bus protocol translations for transactions that need to be communicated over different bus structures having different bus protocols. For example, requesting units, such as USB devices, WLAN devices and NICs may be connected to the interface logic through a bus interface operating according to a first bus protocol while the interface logic communicates with the host processor and other devices through a different bus, such as an internal bus on a die or chip or another external bus, that uses a second and different bus protocol from the first bus protocol, such as one that uses different fields of data, different payload sizes, different transaction status attributes or other protocol differences.

In conventional systems, the interface logic translates transaction requests sent via one type of bus protocol to a transaction request of a different type of bus protocol for multiple requesting units using a hardcoded translation scheme for each requesting unit. This results in larger dies, more power consumption, and more complex die layouts for integrated circuit dies. Also, conventional systems require new die designs when new requesting units are added or when new transaction types are added for existing requesting clients in the system.

There is a need for an improved transaction translation mechanism when communicating transactions using different bus protocols among requesting units and one or more target units.

BRIEF DESCRIPTION OF THE DRAWINGS

FIG. 6 illustrates an example of a bus protocol translation lookup table in accordance with one example set forth in the disclosure.

Figure 1:
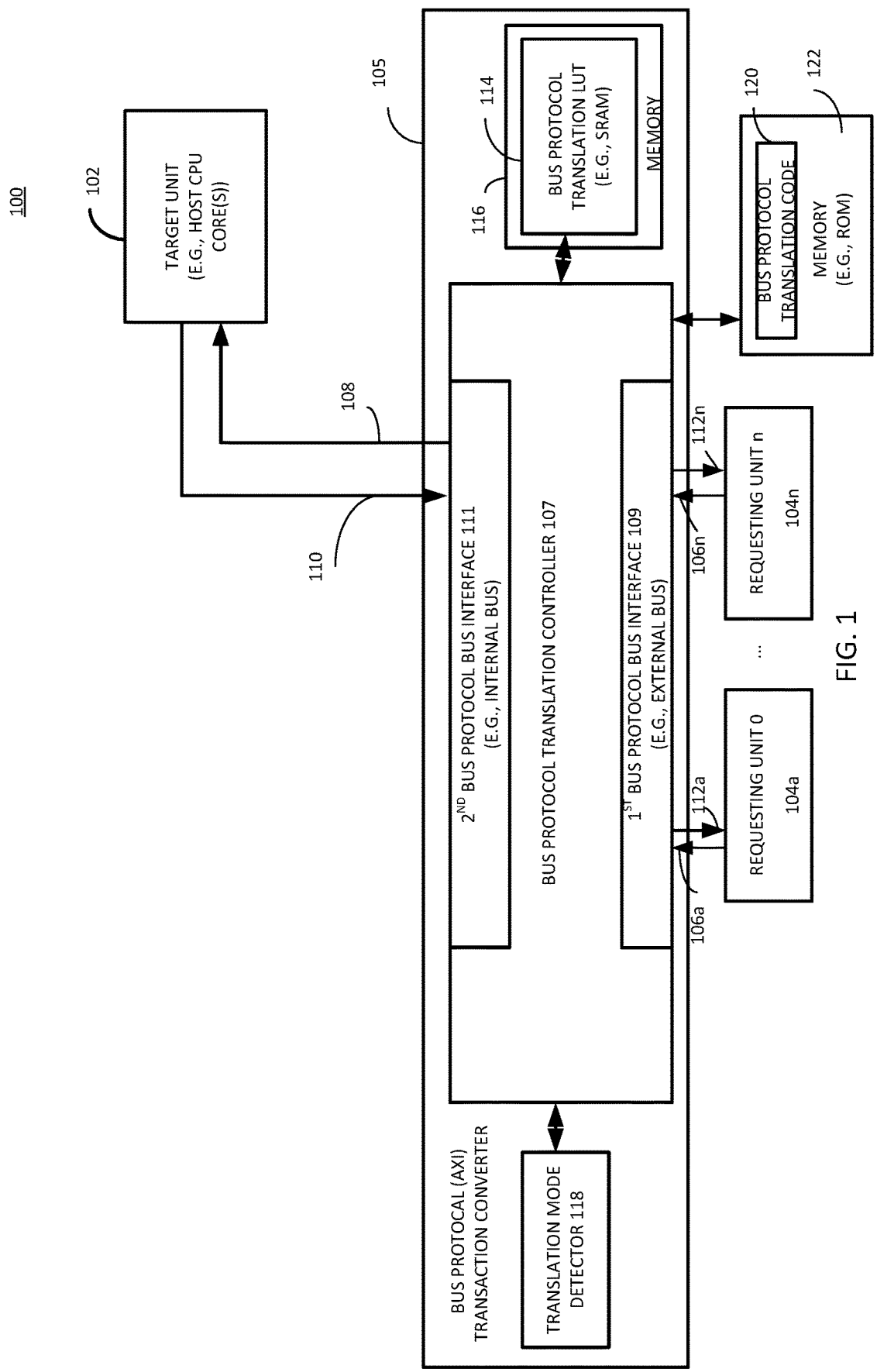
FIG. 1 illustrates a block diagram of an apparatus that translates transaction requests between a plurality of requesting units and a target unit in accordance with one example set forth in the disclosure.

The implementations will be more readily understood in view of the below description when accompanied by the figures, wherein like reference numerals represent like elements. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well. In addition, the functional blocks described herein may be combined with other functional blocks or separated from functional blocks as desired.

DETAILED DESCRIPTION OF IMPLEMENTATIONS

As used herein, a bus covers related hardware components and associated executing software that provide communication protocols. As used herein, a bus type is referred to as having a particular communication protocol and different bus types have different communication protocols. For example, different bus protocols may use different timing operations, data payload sizes, communication channel configurations, status information and other parameters. Also as used herein, a field includes a data field and the data associated therewith.

Computing systems, employ processors executing instances of a Hypervisor, operating systems (OS) and/or applications and connect to peripheral devices, such as discrete graphics processors, hard disk drives, SDXI engines, universal serial bus (USB) devices, network interface cards (NICs), serial advanced technology attachment (SATA) devices and other peripheral clients through expansion buses such as a peripheral component interconnect bus, and/or on-chip communication buses. An example of expansion buses includes a peripheral interconnect bus such as a peripheral component interconnect express (PCIE) bus and/or an interconnect bus compliant with the Advanced extensible Interface (AXI) specification which is based on master/slave point-to-point topology. The peripheral devices and their functional blocks are also referred to as requesting units and are configured to operate as physical functions (PF) and virtual functions (VF) as part of virtual machine (VM) operation and request different types of transactions from a target unit such as the host processor.

Some examples of different types of transaction requests include read/write memory transactions, I/O transactions, configuration transactions and interrupt messages. Some requesting units have multiple functions that each issue multiple types of transaction requests to a target unit for which the transaction requests are intended, such as memory of the host processor, functional unit in the host processor or other device.

In conventional systems, the interface logic by way of example, will convert a transaction request for a target unit to a second protocol request for the target unit, and convert the corresponding second protocol response back to a response that is understood by the requesting unit using a hardcoded translation structure for each requesting client such as dedicated registers and differing dedicated digital logic circuitry for each requesting unit. Also, to translate information for a desired transaction from one bus protocol to another when a response is returned from the target unit, in conventional systems the interface logic needs to compare the value of the requesting unit ID and transaction tag stored in a tag buffer to requesting unit ID data and transaction tag information in a returned response to match an outgoing request to a returned response before sending the response to the requesting client unit.

Such structures can be costly in terms increasing die size of the integrated circuit that employs the interface logic circuitry or other interfaces between multiple requesting units and one or more target units (e.g., processors), and/or adding power consumption, and/or adding design complexity to integrated circuits. Systems employing such structures such as, for example, computer servers providing cloud-based machine learning operations and/or artificial intelligence operations, are particularly sensitive to increased costs due in part to die size increasing, increased power consumption and reduced speed of execution.

As set forth herein, in some implementations a bus protocol translation controller employs a mapping table structure for translating transaction requests and corresponding responses in a first bus protocol used with multiple requesting clients, and a target unit that uses a different second bus protocol. In certain implementations, a bus protocol translation controller encodes transaction translation information, for multiple requesting clients into an addressable bus protocol translation lookup table (LUT). A table entry in the lookup table is an assigned translation table identifier corresponding to each of the plurality of requesting units. When a request comes in, the bus protocol translation controller fetches the related request transaction information from the bus protocol LUT and translates the request for the target unit and sends the translated request to the target unit. In some implementations, when the response comes back from the target unit, the controller also fetches the response related transaction information from the bus protocol LUT, such as from a transaction buffer, to translate the response back to the first protocol for the originating requesting unit. In some implementations, the bus protocol translation LUT includes a read translation LUT and a write translation LUT stored in random access memory (RAM) such as static RAM. In certain implementations, as different requesting clients with different transaction types are added or removed from the system, the controller programs addresses of the bus protocol translation LUT corresponding to the new clients with corresponding bus protocol translation data that is used to perform translation operations without requiring complex die changes.

In some implementations, an apparatus translates transaction requests using a bus protocol translation lookup table (LUT) that includes bus protocol translation data. A bus protocol translation controller generates the outgoing translated transaction request by translating the incoming transaction request using the bus protocol translation data from the bus protocol translation LUT and sends the outgoing translated transaction request for at least one target unit. In some implementations, the controller translates a received response from the target unit back into a response in a protocol used by the requesting unit to send the incoming transaction request.

In certain implementations, the bus protocol translation LUT comprises addressable entries comprising the bus protocol translation data and an entry in the bus protocol translation LUT is indexed by an entry index address corresponding to each of a plurality of requesting units. In some implementations, the bus protocol translation data comprises data representing request bus protocol translation data and corresponding response bus protocol translation data.

In some examples, the bus protocol translation data corresponds to each of the plurality of requesting units for translating between an incoming transaction request sent via a first bus protocol to an outgoing translated transaction request sent via a second bus protocol for the at least one target unit. In some implementations, an apparatus for translating transaction requests includes memory that stores the bus protocol translation lookup table (LUT) that includes bus protocol translation data corresponding to each of the plurality of requesting units for translating between an incoming transaction request sent via a first bus protocol to an outgoing translated transaction request sent via a second bus protocol for the at least one target unit. In some implementations, the bus protocol translation controller receives a response via a second bus protocol from the target unit corresponding to the outgoing translated transaction request, and translates the received response to a response in a first bus protocol and sends the response back to the requesting unit.

In certain implementations, the bus protocol translation controller translates the incoming transaction request into the outgoing translated transaction request using the bus protocol translation data, such that the outgoing translated transaction request includes a unique transaction tag that uniquely identifies the outgoing translated transaction request and includes bus protocol translation data from the bus protocol translation LUT.

In some implementations, the bus protocol translation controller provides a type of hot plug programming of the bus protocol LUT to accommodate the addition of new requesting clients and/or changes in configuration of the requesting clients as to the types of transactions that the requesting clients can send. In certain implementations, in response to a requesting unit configuration change event the bus protocol translation controller waits a timeout period and clears request translation buffers used to translate transaction requests, reprograms the bus protocol translation LUT with updated bus protocol translation data and issues a reprogram event acknowledgement that the bus protocol translation LUT is reprogrammed.

In certain implementations, the apparatus includes a response translation buffer comprising an assigned unique transaction tag and at least a portion of the bus protocol translation data from the bus protocol translation LUT. In some implementations, the bus protocol translation controller is configured to translate a received response using the at least portion of translation data stored in the response translation buffer based on matching a transaction tag in the response with the unique transaction tag stored in the response translation buffer; and send the translated received response to an associated requesting unit.

For example, in some implementations, the bus protocol translation controller assigns a unique tag to the outgoing translated transaction request based on the incoming transaction request and stores the assigned unique tag and at least a portion of the bus protocol translation data from the bus protocol translation LUT corresponding to the incoming transaction request into the response translation buffer. In response to receiving a response via the second bus protocol from the target unit, the bus protocol translation controller matches a transaction tag in the received response with a transaction tag stored in the response translation buffer, translates the received response from the second protocol into a first protocol response using the portion of translation data stored in the buffer based on matching the transaction tag and sends the first protocol response to an associated requesting unit.

In certain implementations, the bus protocol translation controller further comprises a read bus protocol translation controller configured to produce an outgoing translated read request for a corresponding incoming transaction request based on bus protocol translation data from the bus protocol translation LUT; and a write bus protocol translation controller configured to produce an outgoing translated write request for a corresponding incoming transaction request based on bus protocol translation data from the bus protocol translation LUT. An arbiter selects between a translated outgoing read request and a translated outgoing write request and outputs a selected translated request for the target unit.

For example, in some implementations, the apparatus includes a plurality of read ports that receive incoming read transaction requests via the first bus protocol and a plurality of write ports that receive incoming write transaction requests via the first bus protocol. The bus protocol translation controller includes a read bus protocol translation controller configured to produce an outgoing translated read request for a corresponding incoming transaction request by: storing data from the incoming read transaction into a response translation buffer; copying bus protocol translation data from the bus protocol translation LUT into the response translation buffer that corresponds to the requesting unit issuing the incoming read request; and assigning a unique transaction tag to each outgoing read transaction request. In certain implementations, the bus protocol translation controller includes a write bus protocol translation controller that produces an outgoing translated write request for a corresponding incoming transaction request by: storing data from the incoming write transaction into a response write translation buffer; copying bus protocol translation data from the bus protocol translation LUT into the response translation buffer that corresponds to the requesting unit issuing the incoming write request; and assigning a unique transaction tag to each outgoing write transaction request. In some implementations the bus protocol translation controller includes an arbiter, that selects between a translated outgoing read request and a translated outgoing write request and outputs the selected translated outgoing read or write request to the target unit.

In some implementations, the bus protocol translation controller assigns to the plurality of requesting units, the table entry index as a unique table address and programs the bus protocol translation LUT with corresponding bus protocol translation data for each of the plurality of requesting units. In other implementations the table entry indexes are assigned by a manufacturer and stored in firmware of the bus protocol translation controller, and/or firmware of each requesting unit.

In certain implementations, an apparatus includes a target processor, a plurality of requesting clients, such as input/output (I/O) clients, and memory comprising a bus protocol translation lookup table (LUT) that comprises a table entry address that maps to a respective requesting unit of each of the plurality of requesting units. Each table entry address maps to data representing at least request bus protocol translation data and corresponding response bus protocol translation data corresponding to each of the plurality of requesting clients for translating between an incoming transaction request sent via a first bus protocol to an outgoing translated transaction request sent via a second bus protocol for the target unit. The apparatus includes interface logic, comprising a bus protocol translation controller that generates the outgoing translated transaction request by translating the incoming transaction request using the request bus protocol translation data; sends the outgoing translated transaction request for the target processor; and returns a response to the incoming transaction request using the corresponding response bus protocol translation data.

In some implementations, the memory comprises the bus protocol translation LUT that comprises addressable entries comprising the bus protocol translation data and wherein an entry in the bus protocol translation LUT is indexed by an entry index address corresponding to each of the plurality of requesting units and wherein the bus protocol translation data comprises data representing request bus protocol translation data and corresponding response bus protocol translation data.

In some implementations, the bus protocol translation controller of the apparatus, in response to the incoming transaction request sent via the first bus protocol, translates the incoming transaction request to the outgoing translated transaction request such that the outgoing translated transaction request includes a unique transaction tag that uniquely identifies the outgoing translated transaction and includes the request bus protocol translation data from the bus protocol translation LUT.

In certain implementations, the bus protocol translation controller, in response to a requesting unit configuration change event, waits a timeout period and clear response translation buffers used to translate transaction requests, reprograms the bus protocol translation LUT with updated request bus protocol translation data and corresponding response bus protocol translation data; and issues a reprogram event acknowledgement that the bus protocol translation LUT is reprogrammed.

In certain implementations, the apparatus includes a response translation buffer comprising an assigned unique transaction tag associated with an incoming transaction request and at least a portion of the bus protocol translation data from the bus protocol translation LUT. The bus protocol translation controller translates a received response using the at least portion of translation data stored in the response translation buffer based on matching a transaction tag in the response with the unique transaction tag stored in the response translation buffer; and sends the translated received response to an associated requesting unit.

For example, in some implementations the bus protocol translation controller of the apparatus assigns a unique tag to the outgoing translated transaction request based on the incoming transaction request; stores the assigned unique tag and the response translation data from the bus protocol translation LUT corresponding to the incoming transaction request into a response translation buffer; in response to receiving a response via the second bus protocol from the target unit, matches a transaction tag in the received response with a transaction tag stored in the response translation buffer; translates the received response from the second protocol into a response using the response translation data stored in the buffer based on matching the transaction tag; and returns the response to an associated requesting unit.

In some implementations, the apparatus includes a read bus protocol translation controller that produces an outgoing translated read request for a corresponding incoming transaction request based on bus protocol translation data from the bus protocol translation LUT. The apparatus includes a write bus protocol translation controller that produces an outgoing translated write request for a corresponding incoming transaction request based on bus protocol translation data from the bus protocol translation LUT. An arbiter selects between a translated outgoing read request and a translated outgoing write request and output a selected translated request for the target unit.

In certain implementations, the apparatus includes a plurality of read ports configured to receive incoming read transaction requests via the first bus protocol and a plurality of write ports configured to receive incoming write transaction request via the first bus protocol, and the bus protocol translation controller includes a read bus protocol translation controller configured to produce an outgoing translated read request for a corresponding incoming transaction request by: storing data from the incoming read transaction into a response translation buffer; copying the response bus protocol translation data from the bus protocol translation LUT into the response translation buffer that corresponds to the requesting unit issuing the incoming read request; assigning a unique transaction tag to each outgoing read transaction request; and a write bus protocol translation controller configured to produce an outgoing translated write request for a corresponding incoming transaction request by: storing data from the incoming write transaction into a response write translation buffer; copying bus protocol translation data from the bus protocol translation LUT into the response translation buffer that corresponds to the requesting unit issuing the incoming write request; and assigning a unique transaction tag to each outgoing write transaction request; an arbiter, operatively coupled to the write bus protocol translation controller and read bus protocol translation controller, configured to select between a translated outgoing read request and a translated outgoing write request and output a selected translated request for the target unit.

In some implementations, the apparatus includes the bus protocol translation controller that assigns to the plurality of requesting I/O clients, the table entry address as a unique table address and program the bus protocol translation LUT with the request bus protocol translation data and the corresponding response bus protocol translation data for each of the plurality of requesting units.

In certain implementations, the apparatus includes interface logic that further comprises a first protocol bus interface, a second protocol bus interface and wherein the controller is configured to receive transaction requests from the plurality of requesting I/O clients via the first bus protocol interface and send the outgoing translated transaction request for the target processor via the second bus protocol interface; and return the response to the incoming transaction request using the first protocol bus interface.

In some implementations, the apparatus includes memory that comprises a read bus protocol translation lookup table (LUT) that comprises a table entry address that maps to a respective read requesting unit, each table entry address mapping to data representing at least read request bus protocol translation data used by the read bus protocol translation controller; and a write bus protocol translation lookup table that comprises a table entry address that maps to a respective write requesting unit, each table entry address mapping to data representing at least write request bus protocol translation data used by the write bus protocol translation controller.

In some implementations, a method for translating transactions includes translating between an incoming transaction request to an outgoing translated transaction request using a bus protocol translation lookup table (LUT) that comprises bus protocol translation data. The method includes generating the outgoing translated transaction request by translating the incoming transaction request using the bus protocol translation data and sending the outgoing translated transaction request for the target unit.

In some implementations the method includes, in response to the incoming transaction request sent via the first bus protocol, translating the incoming transaction request to the outgoing translated transaction request using the bus protocol translation data, such that the outgoing translated transaction request includes a unique transaction tag that uniquely identifies the outgoing translated transaction and includes bus protocol translation data from the bus protocol translation LUT.

In certain implementations the method further includes, in response to a requesting unit configuration change event: waiting a timeout period and clear response translation buffers used to translate transaction requests; reprograming the bus protocol translation LUT with updated bus protocol translation data; and issuing a reprogram event acknowledgement that the bus protocol translation LUT is reprogrammed.

In some implementations, the method includes assigning a unique transaction tag to the outgoing translated transaction request based on the incoming transaction request; translating a received response using a portion of bus protocol translation data stored in a response translation buffer based on matching a transaction tag in the received response with the unique transaction tag; and sending the translated received response to an associated requesting unit.

In some implementations, the method further includes assigning a unique tag to the outgoing translated transaction request based on the incoming transaction request; storing the assigned unique tag and at least a portion of the bus protocol translation data from the bus protocol translation LUT corresponding to the incoming transaction request into a response translation buffer; in response to receiving a response via the second bus protocol from the target unit, matching a transaction tag, such as a value, in the received response with a transaction tag stored in the response translation buffer; translating the received response from the second protocol into a first protocol response using the portion of bus protocol translation data stored in the buffer based on matching the transaction tag; and sending the first protocol response to an associated requesting unit.

In some implementations the method further includes assigning to the plurality of requesting units, a unique table address entry and programming the bus protocol translation LUT with corresponding bus protocol translation data for each of the plurality of requesting units.

FIG. 1 is a block diagram illustrating one embodiment of an apparatus for translating transaction requests between a plurality of requesting units and at least one target unit. The apparatus, in some implementations is a computer processing system 100 such as a data center server, laptop, mobile phone, internet appliance, a system on chip (SoC) coupled to requesting units, or other suitable device. In this example, the computer processing system 100 includes one or more systems on chips that interface with requesting units, such as requesting I/O clients. In this example, one or more target units 102 are configured to execute instructions stored in system memory and in some examples, a target unit includes a central processing unit (CPU), graphics processing unit (GPU), accelerated processing units (APUs), machine learning unit, artificial intelligence unit or other suitable processing devices implemented on a system on chip. Each of the target units include, in some examples, a plurality of processing cores.

A plurality of requesting units 104a-104n, issue transaction requests 106a-106n that request the target unit 102 to perform one or more operations. It will be recognized that each requesting unit can have multiple functional units, that are physical functional units and/or virtual functional units, that each issue transaction requests. It will also be recognized that the requesting units 104a-104n in some implementations, also serve as target units and the target unit 102 serve as a requesting unit that requests operations of the requesting units 104a-104n to perform some action such as store information in their local memory or perform other operations as desired. In some implementations, the transaction requests include read and/or write requests to local memory of the target unit, to other memory accessible via the target unit or other types of requests as desired.

In some examples, the client requesting devices 104a-104n include discrete graphics processing units, USB devices, network interconnect device or other devices including identified virtual machines of the devices, identified functions (virtual and/or physical functions) of the requesting devices that are connected to the host target through the interface logic 105. A requesting device includes for example I/O devices, I/O device functions, functions internal to the interface logic or any suitable component that issues transaction requests that the interface logic 105 uses to generate translated transaction requests for the target device.

Interface logic 105 is electronic circuitry that serves as a bus protocol transaction converter and in some implementations serves as a peripheral component interface with the host processor. In this example, the interface logic 105 includes a bus protocol translation controller 107 and a bus protocol translation lookup table (LUT) 114. The interface logic 105 also includes a first bus protocol interface 109, such as an Advanced extensible Interface (AXI), that provides an external communication bus with the requesting units and a second protocol bus interface 111 that provides an internal bus (for example internal to an integrated circuit chip or SoC) having a different bus protocol than the bus protocol of the external bus. It will be recognized that the internal and external buses can any suitable types of differing protocol buses or that the buses can be both internal or both external buses depending on the system architecture.

The interface logic 105 in some implementations is implemented as bus bridge circuitry that translates the incoming transaction requests 106a-106n from the requesting units communicated according to a first bus protocol used by an external bus, to a corresponding outgoing transaction request 108 according to a second and different bus protocol used by an internal bus for communication to the target unit and translates a corresponding response 110 from the target unit before sending back the response to the requesting unit (also referred to as an originator) using the bus protocol translation lookup table 114 stored in memory 116, such as SRAM. Interface logic 105 translates transaction requests between requesting units and target units. From an upstream communication direction, interface logic 105 receives an incoming transaction request 106a from a requesting unit 104a-104n via a bus operating according to a first bus protocol, translates the incoming transaction request to an outgoing request 108 that is communicated for the target unit in using a bus operating using a different bus protocol. The target unit 102 performs the transaction as requested and returns a response 110 to the interface logic 105 which translates the response compliant with the second bus protocol, to a response 112a-112n in the first bus protocol using the bus protocol translation lookup table (LUT) 114 and forwards the response 112a-112n to the requesting unit 106a-106n that issued the transaction request.

In certain implementations, the interface logic 105 includes a translation mode detector 118, such as a state machine or other digital logic circuitry including for example a programmed controller that receives via a side band channel, an indication that the bus protocol translation controller 107 should reprogram the bus protocol translation lookup table 114 to be reconfigured for a new type of requesting unit or new functions of an existing requesting unit. In some implementations the translation mode detector 118 includes a programmable register that is programmed by an operating system, or firmware to allow the reprogramming of the bus protocol translation lookup table 114 as further described below. In some implementations the translation mode detector 118 is part of the bus protocol translation controller 107.

Figure 2:
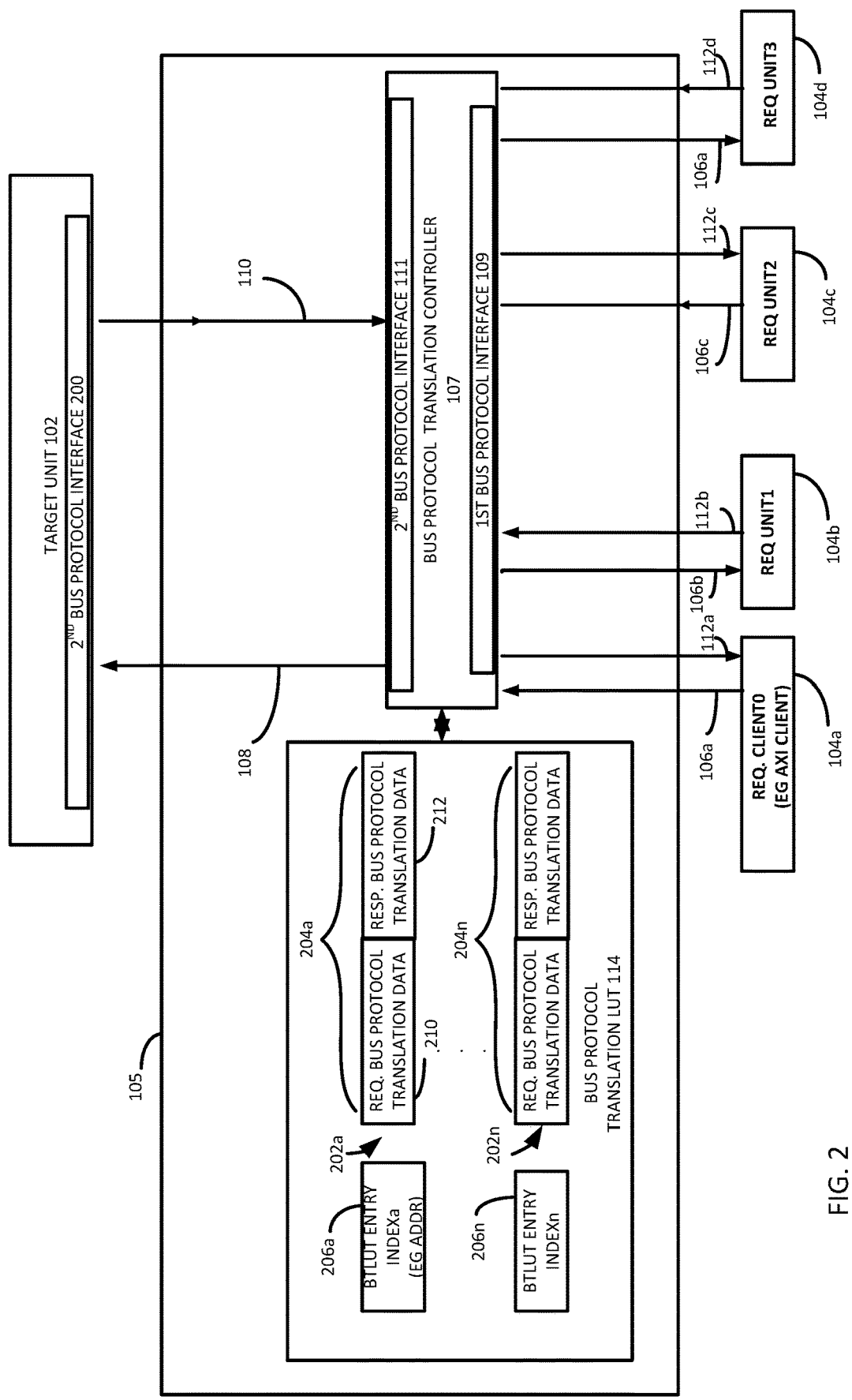
FIG. 2 illustrates a block diagram of another apparatus that translates transaction requests between a plurality of requesting units and at least one target unit in accordance with another example set forth in the disclosure.

Referring also to FIG. 2, in this example, the target unit 102 includes a corresponding second bus protocol interface 200 that is compliant to communicate data and commands via an internal bus operating according to the second bus protocol and receives the outgoing transaction request 108 and sends the response 110 to the second protocol bus interface 111. In one implementation, the respective first and second bus protocol interfaces include request ports, as known in the art that are compliant with the bus protocol being employed. It will be recognized that the controller 107 in some implementations includes the protocol request ports such as a write request port and read request port for each of the various requesting units.

The bus protocol translation LUT 114 in some implementations includes a single programmable LUT and in other implementations includes a plurality of LUTs as desired. In certain implementations, the bus protocol translation lookup table (LUT) 114 includes entries 202a-202n that include bus protocol translation data 204a-204n. Each of the entries 202a-202n correspond to each of the plurality of requesting units 104a-104n and are addressable by a corresponding entry index 206a-206n, also referred to as a translation table identifier, and read by the controller 107 to translate an incoming transaction request 106a sent via a first bus protocol, such as of the external bus, to an outgoing translated transaction request 108 sent via a second bus protocol, such as of the internal bus, for the target unit. As such the bus protocol translation LUT 114 is a common table used to translate transaction requests for multiple requesting units. In some implementations, the bus protocol translation data 204a-204n includes request bus protocol translation data 210 used to translate the incoming transaction request 106a to the target unit and response bus protocol translation data 212 used to translate the returned response 110 from the target unit.

The bus protocol translation LUT 114 includes entries that map to a respective requesting unit of each of the plurality of requesting units. In this example, each entry includes bus protocol translation data 204a-204n and is accessed using a requesting unit identifier that serves as a unique table address entry, also referred to as a table entry index 206a-

206n which in one implementation is an address in memory. In this example, each table entry index 206a-206n is a set of bits sent in a transaction request from the requesting unit and corresponds to an address in the bus protocol translation lookup table 114. In this example, a table entry index includes a direct or indirect (e.g., pointer to the address) memory address of the translation lookup table. The set of table entry index bits in one example is assigned to each requesting unit by any suitable process, such as through an initialization process by the controller 107 executing firmware that contains the assigned table entry indexes, programmed in configuration registers of requesting units and retrieved during an initialization process, provided by firmware of the requesting unit, or in any suitable manner.

In some implementations, as part of an initialization process, the bus protocol translation controller 107 detects which requesting units are present and assigns to each of the plurality of requesting units a table entry index as a unique table address and sends the assigned table entry index (e.g., translation table ID) to each respective requesting unit. The requesting unit stores the assigned table entry index in a local configuration register. In some implementations, requesting units include multiple requestors (e.g, functions) that each send different transactions and therefore a table entry index is assigned to each function of the requesting unit that issues transactions and are stored in local configuration registers of the requesting unit. The bus protocol translation controller 107 programs the bus protocol translation LUT with corresponding bus protocol translation data for each of the plurality of requesting units and additional requesting functions.

The bus protocol translation data 204a that is read by the controller 107 includes data representing request bus protocol translation data 210 that in some examples is data that is inserted by the controller 107 into data fields of an outgoing request 108, is data that indexes to another translation table, registers or translation rule that is programmed in the controller, or is data that otherwise defines how to map data that is communicated from one bus protocol to the other. Corresponding response bus protocol translation data 212 in some examples is data that is inserted into payload fields of an outgoing response 112a and/or is data that defines how to map response data from one bus protocol to the other. Other entries unique to other requesting units are shown to also include data representing request bus protocol translation data and corresponding response bus protocol translation data. It will be recognized that other types of entries may also be included in the bus protocol translation LUT 114 if desired.

In this example, the bus protocol translation lookup table 114 is defined, such as by a manufacturer of the integrated circuit chip that includes the bus protocol translation converter and is initially included as part of the bus protocol translation code 120 stored in ROM as part of firmware code. For example, in one implementation, the type of requesting units and their configuration is known a priori and the bus protocol translation lookup table 114 is defined by a manufacturer knowing the types of requesting units and their configuration for request types. Once the bus protocol translation code 120 is executed by the controller 107, the controller 107 stores the bus protocol translation lookup table 114 in random access memory for use during normal operating mode of the apparatus. In some implementations, the bus protocol translation lookup table 114 is reprogrammed when the bus protocol translation controller 107 detects, such as through an operating system, BIOS or other detection mechanism, that a new requesting unit has been added or that an existing requesting unit has a new configuration.

In some implementations, the bus protocol translation controller 107, includes a programmable microcontroller that executes bus protocol translation code 120 that is stored in memory 122 such as read only memory (ROM) and executes the bus protocol translation code, such as firmware code, to populate the bus protocol translation LUT 114 prior to a BIOS starting or at any other suitable operational time. The bus protocol translation controller 107 generates the outgoing translated transaction request 108 by translating the incoming transaction request 106a using the request bus protocol translation data 210 from the bus protocol translation LUT 114 and sends the outgoing translated transaction request 108 for the target unit. The controller 107 returns a response 112a to the incoming transaction request 106a using the corresponding response bus protocol translation data 212. The controller, in some implementations also includes one or more state machines, suitable digital circuitry, and any suitable combination of hardware and executable instructions executing on one or more processors to operate as described herein.

Also, in some implementations, all requesting units share the same bus protocol translation LUT. However, it will be recognized that other structures may be employed and the lookup tables may be combined into a single table or split into other desired formats. The interface logic 105 is implemented as electronic circuitry and in some implementations includes one or more of state machines, digital logic, memory, gate arrays, microcontrollers that execute stored firmware, or any suitable logic circuitry. However, it will be recognized that any suitable structure may be employed.

Figure 3:
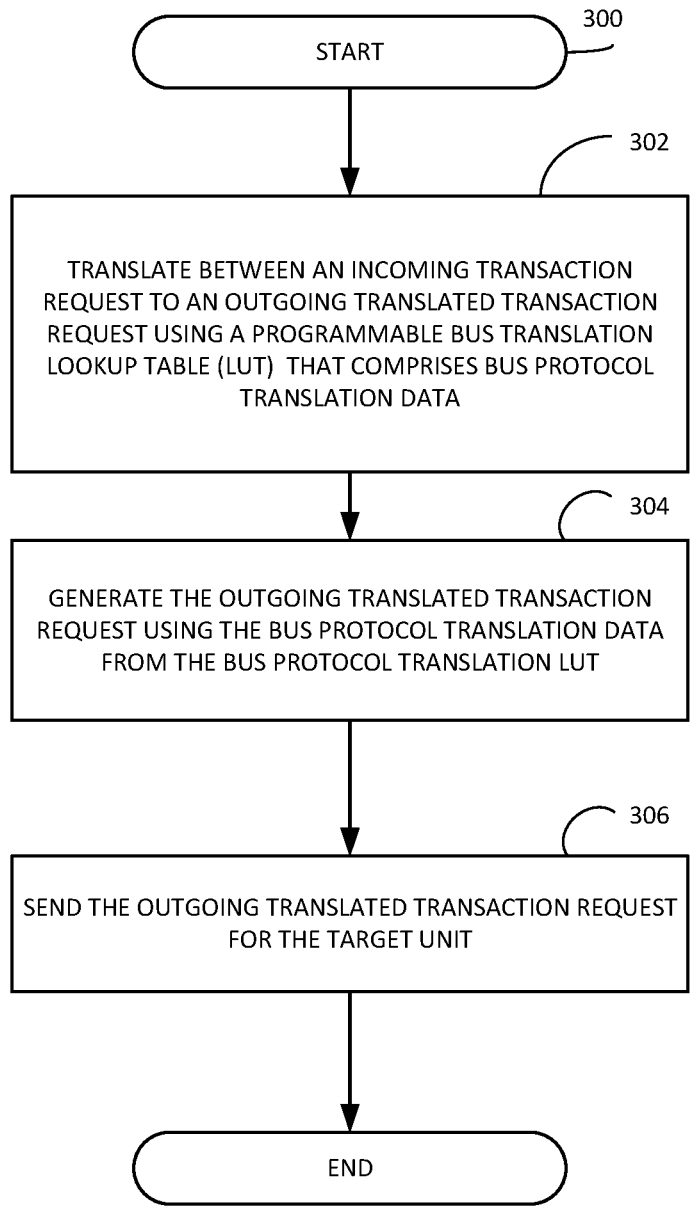
FIG. 3 is a flowchart illustrating a method for translating transaction requests between a plurality of requesting units and at least one target unit in accordance with one example set forth in the disclosure.

Referring also to FIG. 3, a method for translating transaction requests, such as between at least one requesting unit and at least one target unit, is shown and will be described with reference to the bus protocol translation controller and bus protocol LUT of FIGS. 1 and 2. It will be recognized however that any suitable structure may be used. It will also be recognized that the operations may be performed in any suitable order. In some implementations, a target unit can also become the requesting unit and a requesting unit can also become a target unit for transaction requests. As shown in block 300, the method includes receiving an incoming transaction request 106a, such as via the $1^{st}$ bus protocol interface 109 from a requesting unit 104a via a request channel of the external bus, for a target unit 102. In one example this is a transaction request for a host processor from one or more peripheral I/O clients that are configured to communicate in accordance with AXI protocol. However, any suitable transaction request can be employed depending upon the type of system employed. Unlike known systems, the incoming transaction request 106a includes a translation table identifier, such as bus protocol translation LUT address also referred to a table entry index 206 (or a pointer to an address of the LUT) in the request.

As shown in block 302 the method includes translating, by the bus protocol translation controller, between the incoming transaction request 106a sent via a first bus protocol to an outgoing translated transaction request 108 sent to the target unit via a second bus protocol using the bus protocol translation lookup table (LUT) 114 that includes bus protocol translation data 204a-204n corresponding to each of the plurality of requesting units 104a-104n. As shown in block 304, the method includes generating, by the bus protocol translation controller, the outgoing translated transaction request 108 by translating the incoming transaction request 106a using the bus protocol translation data 204a. In one example where both the request bus protocol translation data 210 and the response bus protocol translation data 212 are employed, the request bus protocol translation data 210 is used to translate the incoming request. As shown in block 306 the method includes sending the outgoing translated transaction request 108 for the target unit. After the request is processed by the target unit, the target unit sends the response 110 back via the internal bus using the second protocol bus interface 200 to the interface 111 of the interface logic 105. The returned response 110 that is received is translated into a response 112a compliant with the 1$^{st}$ bus protocol using the corresponding response bus protocol translation data 212. The bus protocol translation controller 107 returns the response 112a to the incoming transaction request 106a. The bus protocol translation LUT 114, which is a type of mapping table, saves die area compared to prior architectures since hardcoded logic and wiring traces to carryout translations for each requesting unit is eliminated or reduced. The bus protocol translation LUT 114 is programmable and easy to extend in size to accommodate more client configurations. For example, when a client configuration changes so that a new type of request can be issued by the client, a new request unit identifier is assigned to the client which corresponds to an address in the bus protocol translation LUT and the corresponding entry is programmed with the translation data needed to translate for the new client configuration.

Figure 4:
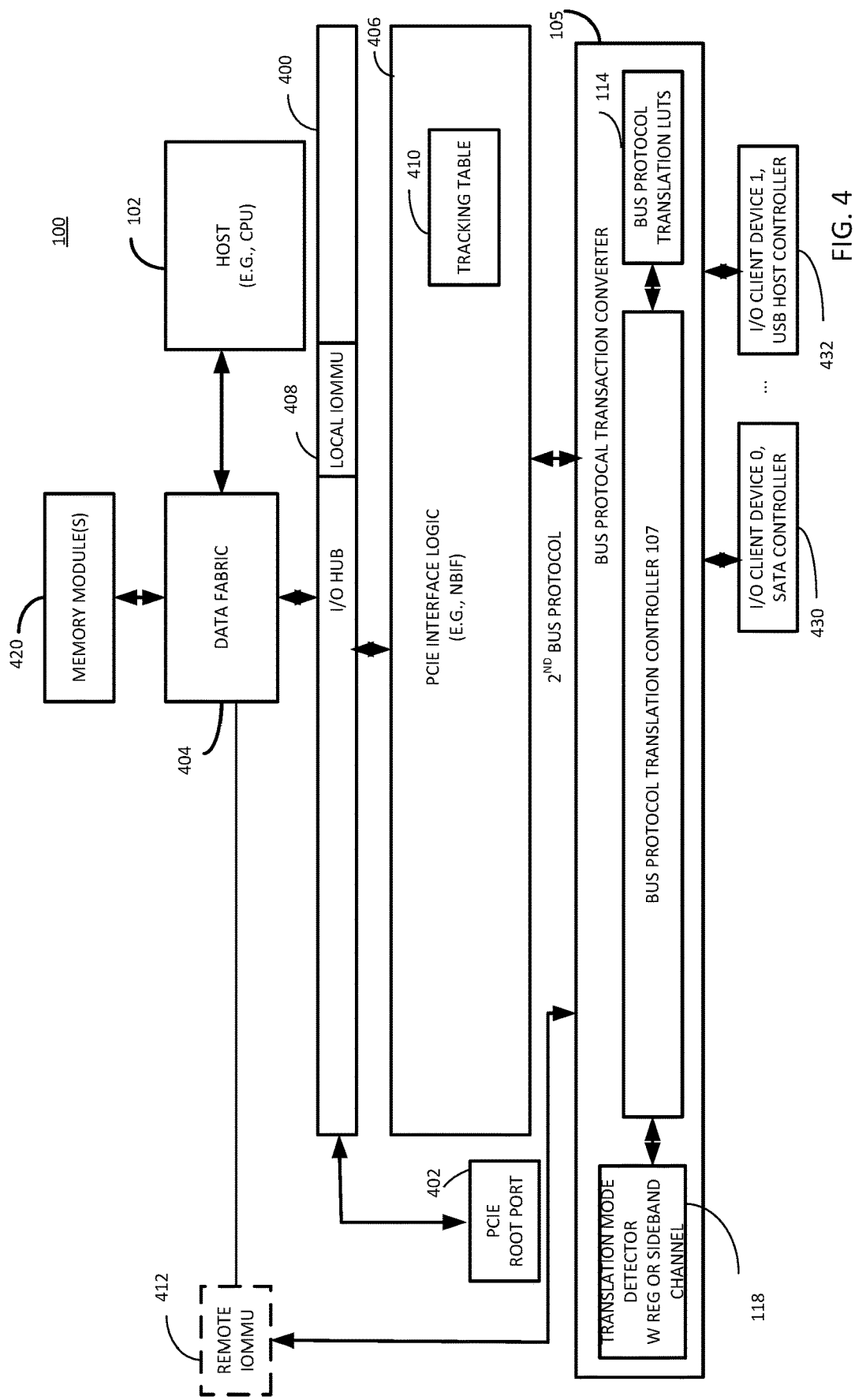
FIG. 4 illustrates a block diagram of another apparatus that translates transaction requests between a plurality of requesting units and at least one target unit in accordance with another example set forth in the disclosure.

FIG. 4 illustrates another example of the computer processing system 100, such as a data center server, however it will be recognized that any suitable apparatus configuration may be employed. In this example, the target unit 102 includes a host target processor such as multi-core central processing unit, multi-core GPU, multi-core APU or any suitable processor that performs transactions requested by peripheral device requesting units 104a-104n. In this example, in an upstream flow, an I/O hub 400 gathers transactions from the interface logic 105 that come from the requesting clients and from other PCIE root ports 402, and peripheral component interface express (PCIE) logic 406 and forwards the transaction requests to the target processor through a data fabric 404. The PCIE interface logic 406, as known in the art, has access to the PCIE configuration space for each requesting unit (including device functions). It will be recognized that the I/O hub 400 as known in the art interconnects various I/O bridges or ports to the data fabric and includes local I/O memory management units 408. In this example the PCIE interface logic 406 is an I/O peripheral component interface and employs a table 410 to differentiate clients and manages timeout tracking for requests such that dummy responses are provided if a response is not received from the target unit within a desired timeout period, however any suitable interface device may be employed. The bus protocol transaction converter in this example also communicates with remote input output memory management units 412 to accommodate additional input output device transaction conversion if desired. Memory modules 420 if desired are coupled to the data fabric 404 and may also access the target unit, or requesting units (e.g., client devices) and the client devices may access the memory modules.

In some examples, the client devices include discrete graphics processing units, USB devices, SATA controllers, network interconnect (NIC) devices or other devices including functions (virtual and/or physical functions) of the devices and are connected to the host target unit through bus protocol transaction converter and the peripheral component interconnect interface logic 406. The memory modules 420 can also serve as target units and/or requesting unit. In this example the bus protocol transaction converter converts requests that are sent via the AXI protocol from input output client devices 430 and 432 which are the requesting units in this example.

Figure 5:
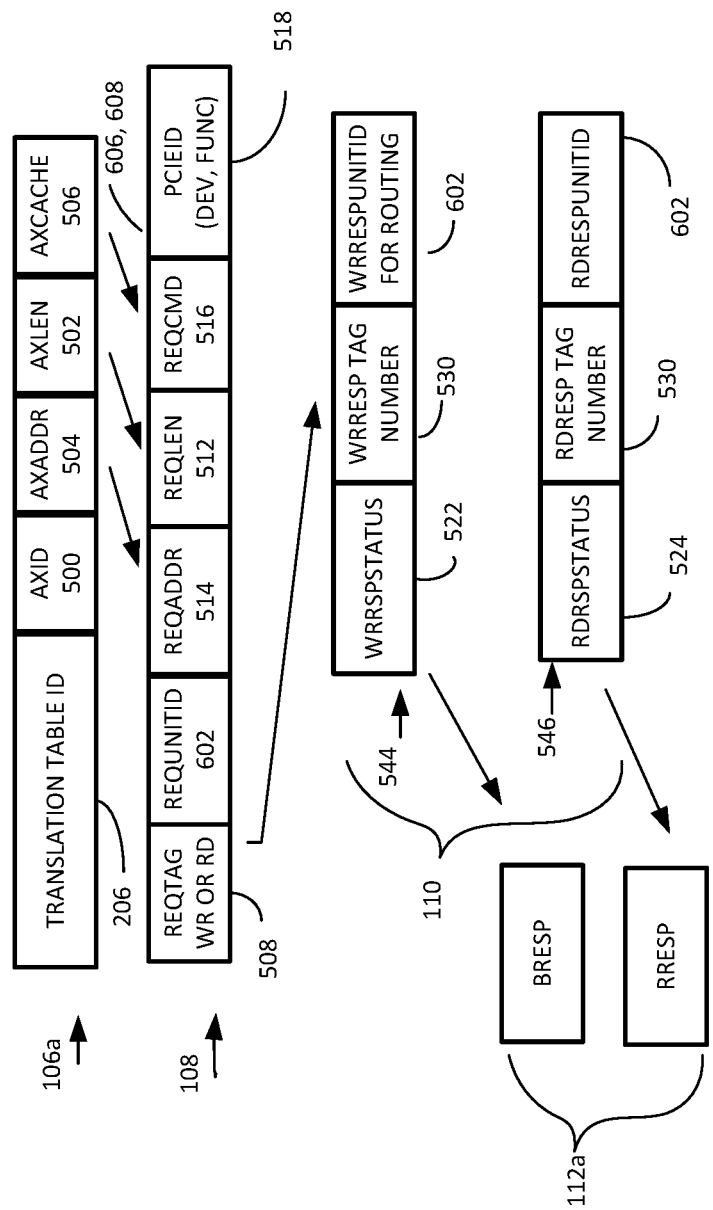
FIG. 5 is a diagram illustrating transaction requests, translated transaction requests and corresponding responses in accordance with one example set forth in the disclosure.
Figure 7:
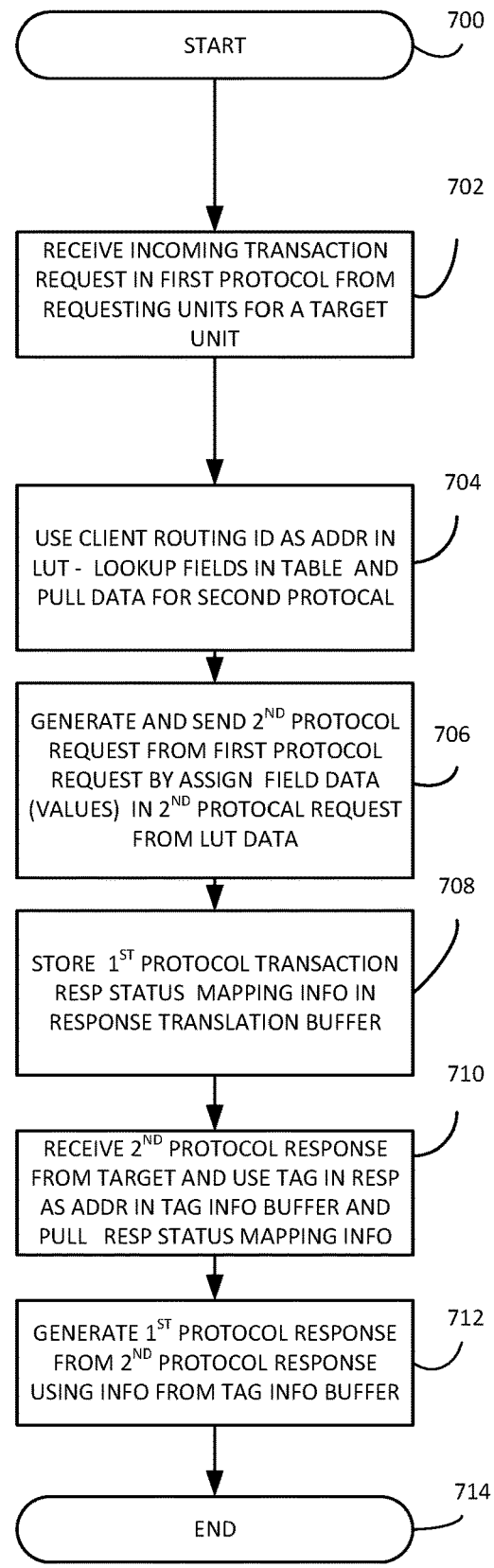
FIG. 7 is a flowchart illustrating a method for translating transaction requests between a plurality of requesting units and at least one target unit in accordance with one example set forth in the disclosure.

Referring also to FIGS. 5, 6 and 7, an operating example will be described. In this example, the first bus protocol is the AXI protocol and the second bus protocol is different from the AXI protocol by for example having different channel payload sizes, different transaction status signaling and different control data. However, any suitable different bus protocol may be employed.

To case in explanation, it will be recognized that all attributes of AXI transactions are not described herein but are known in the art. In this example, an AXI ID (AXID) field 500 includes bits that serve as the AXI transaction identifier assigned in the request by a requesting client. As known in the art, in AXI protocol, a master can use these to identify separate transactions that must be returned in order. All transactions with a given AXID value remain ordered, but there is no restriction on the ordering of transactions with different ID values. This means a single physical port can support out-of-order transactions by acting as a number of logical ports, each of which handles its transactions in order. By using AXIDs, a master can issue transactions without waiting for earlier transactions to complete. In this example, the second protocol does not use an AXID and as further described below, the controller 107 stores the AXID in a buffer when translating a request and adds the AXID back in for the corresponding AXI response (BRESP or RRESP).

An example of an incoming transaction request 106a is shown to include bit fields or attributes and in this example 6 bits [5:0] are referred to as a translation table identifier (Translation table ID) corresponding to the requesting unit, also referred to as the table entry index 206, which in this example is an address in the bus protocol look up table 114. Specific translation table IDs corresponding to different requesting units are shown as table indexes 206a-206c. The table entry index 206 is an added data attribute to each AXI request to allow the controller 107 to read from the bus protocol translation LUT 114 to translate a given transaction request. The entry index 206 in one example are bits assigned in the AXI USER field in an AXI request by the client, or controller 107, and used as an index to read the bus protocol translation LUT 114. For example, in this example, the transaction table ID, namely the table entry index 206 are 6 bits that are inside an AXI request user field such as AWUSER for write transactions or ARUSER for read transactions and as such are compliant with standard AXI protocol.

In this example, the incoming transaction request 106a has a field 500 with bits identifying one transaction identifier (AXID), and different transactions could have the same AXID. As also shown, in AXI protocol there are bits to identify a length field 502 AXLEN that define the number of data transfers possible in each burst transaction, address bits to identify an address field 504 AXADDR that define which address of memory to be written or read, and cache management bits in field 506 AXCACHE that define for example whether the response has come from the destination or somewhere in between, bits to identify if the response is cacheable or modifiable and bits to identify if there is a cache miss on read or a cache miss on a write. However, any suitable attributes may be employed.

In the second protocol in this example, the corresponding outgoing transaction request 108 includes a request tag 508 given to each request by the controller 107, a ReqUnitID 602 from the bus protocol translation LUT 114 and one or more fields 518 populated based on data in the bus protocol translation LUT 114. The controller is also programmed to map data in AXADDR field 504 to field 514, data in AXLEN field 502 to field 512 and data in AXCACHE field 506 to field 516. The request tag 508 is used to uniquely identify each outstanding request from a unit of the originator attached via to a given port of the second bus protocol interface. In the second bus protocol, the ReqUnitID 602 identifies the unit within the originator that initiated the transaction. In this example, the status information of a response 110 according to the second protocol is also different from status information of a response 112a in the first protocol. For example, write response status information 522 and read response status information 524 is different from an AXI protocol response such as a read response (RRESP) and write response BRESP). In this example, the response bus protocol translation data 212 informs the controller 107 which status conversion mapping to use for a particular requesting unit. However, it will be recognized that any suitable type of response translation data can be coded in the bus protocol translation LUT 114.

FIG. 6 illustrates an example of the bus protocol translation LUT 114. In this example, an entry is populated with bus protocol translation data having multiple fields depending on the type of translation needed based on client configurations and their functions. In this example, an entry has bus protocol translation data that includes a valid field 600, a requesting unit identifier (ReqUnitID), also referred to as field 602, a dependent data field 604 that indicates whether to use other fields in the entry, a PCIE device identifier field 606, a PCIE function field 608, a first response translation field 610 for a response status translation and a second response translation field 612 for a second response status translation. In this example the request bus protocol translation data 210 includes fields 602, 604, 606 and 608 whereas fields 610 and 612 are the response bus protocol translation data 212. In this example, the response translation fields 610 and 612 contain data that is used to translate status codes sent by the target unit is responses to requests. The dependent data field 604 in this example indicates whether the transaction request belongs to a PCIE function. As shown, if the bit is a "1" then a PCIE function is present and the data from corresponding fields 606 and 608 are used. The valid field 600 bit tells the controller whether a request is legal. For example, if the bus protocol translation controller 107 receives a transaction request with a table entry index 206 and reads the translation LUT 114, and finds that the valid bit is "0" then the controller 107 will report that the transaction is illegal to the operating system or other process.

In this example, the translated outgoing transaction request 108 has a unique read or write request tag 508 that is assigned by the controller and the unique ReqUnitID 602 from the bus protocol translation LUT. The ReqUnitID 602 indicates which client the transaction request belongs to and one client could be assigned 1-4 ReqUnitIDs. The ReqUnitID 602 is configurable by the bus protocol translation LUT 114. As shown in this example, some requesting clients do not require a translation to occur and are shown to have "0"s in each of the fields, such as entry indexes 0x1-0x3. These entries are reserve entries and are populated when a client changes capability or if a new client is added. Entries corresponding to entry indexes 206a, 206b and 206c are used to translate incoming requests from the corresponding requesting clients and corresponding responses from the target unit.

The controller 107 reads the dependent data field 604 to determine how to populate the field 518 of the outgoing request 108, referred to as PCIEID, which in this example is 16 bits. The PCIEID value defines PCIE information of a transaction if the transaction is a PCIE type of transaction and requires data identifying a bus number, device number and function number for a device. In one example the 16 bits are such that PCIEID [15:0]={bus [7:0], device [4:0], function [2:0]}. When dependent data field 604 in the LUT 114 is "Is_PCIE_func"=0, then the PCIEID is a fixed value. However, when "Is_PCIE_func"=1, the PCIEID field 518 is populated such that {bus ID is a fixed value, DEV value is taken from field 606, FUNC value is taken from field 608}. As such whether to populate field 518 with data from fields 608 and 610 is dependent on the value in the dependent data field 604.

FIG. 7 is a flowchart illustrating a method for translating transaction requests between a plurality of requesting units and at least one target unit using the bus protocol translation lookup table 114. The method in this example is carried out by the bus protocol translation controller 107. However, any suitable structure may be employed. Also, the order of the operations may also be carried out in any suitable order. As shown in block 700, in response to a power on or reset condition and prior to a BIOS completing, a microcontroller of the controller 107 executes the bus protocol translation code 120 and populates the bus protocol translation lookup table 114 by writing values into the bus protocol translation lookup table 114 for each connected requesting client using the assigned entry index translation table ID assigned to each client by the controller during an initialization process, and the other bus protocol translation data for the connected requesting clients.

During normal operation, as shown in block 702 the method includes receiving, by the controller 107, an incoming transaction request in the first protocol from a requesting unit for the target unit via the first bus protocol interface 109. As shown in block 704, the method includes using the assigned translation table ID in the request, which is the table entry index 206 data from the request to look up corresponding translation data in the fields in the bus protocol translation lookup table 114. In one example the translation table ID includes both a client identifier and bits indicating a transaction type.

As shown in block 706, the method includes generating and sending the outgoing transaction request 108 according to the second protocol to the target unit by using the bus protocol translation data from the bus protocol translation LUT 114 to generate the outgoing request. For example, in response to the incoming transaction request, such as through a port of the first bus interface, the controller 107 assigns a unique transaction tag (referred to as a request tag) that is data that uniquely identifies the outgoing translated transaction request and translates the incoming transaction request to the outgoing translated transaction request using the bus protocol translation data, such that the outgoing translated transaction request includes the unique transaction tag and includes bus protocol translation data from the bus protocol translation LUT. In one example, the controller 107 reads the bus protocol translation data for the incoming transaction request using address in the incoming request an index entry into the LUT 114 and assigns data from the incoming request to fields in the outgoing request, assigns field data from the bus protocol translation lookup table into fields of the outgoing protocol request and uses other of the bus protocol translation data to invoke indexed rules for translation. In operation, the bus protocol translation controller 107 uses the translation table ID, which for example is the table entry index 206*a*, in the incoming transaction request 106*a* to read the corresponding entry from the bus protocol translation lookup table 114. Using table entry index 206*a* as an example, the controller 107 generates the outgoing request 108 to include the requesting unit ID data 602 and assigns both the DEV field 606 data and the FUNCTION field 608 data in a PCIEID field 518 of the outgoing response when the dependent data field 604 is a logical "1", copies or pre-translates the data from fields 502, 504 and 506 in the original request to data fields 512, 514 and 516 in the outgoing request, and adds a unique request tag 508 that is used as a mechanism to match outgoing requests in a request channel to the target unit with a returned response in a response channel from the target unit.

By way of example, when the table entry in the transaction request is "0x8" shown as table entry index 206*c*, the outgoing request 108 will include the value "0x002" as the request unit ID 602, the controller populates the field 518 as defined by configurable fields 604, 606 and 608 to define the PCIE device and function of the requesting unit to the target unit according to the second bus protocol, and transfers information from other AXI protocol fields 502, 504 and 506 to corresponding fields 512, 514 and 516 of the outgoing transaction request 108 via the second bus protocol. In some implementations, transferring information between the fields includes performing a pre-translation operation on the data as needed. For example, the first bus protocol interface 109 includes input read and write ports in some implementations that include mapping hardware circuitry that maps data from a first bus protocol format to another format that is compliant with the second protocol. In some implementations the bus protocol translation lookup table 114 includes bus protocol translation data for both read and write transaction types.

In addition to using the translation data in the bus protocol translation lookup table 114, the controller 107 assigns the unique request tag 508 to the outgoing translated transaction request 108 and stores the AXID so that it can be reassociated with the response to the incoming transaction request. For example, the unique request tag is from a pool of different request tag values so that each pending request has a different request tag. When a response is returned, the request tag is placed back in the pool for reuse with another transaction request. However, any suitable mechanism may be employed.

Figure 8:
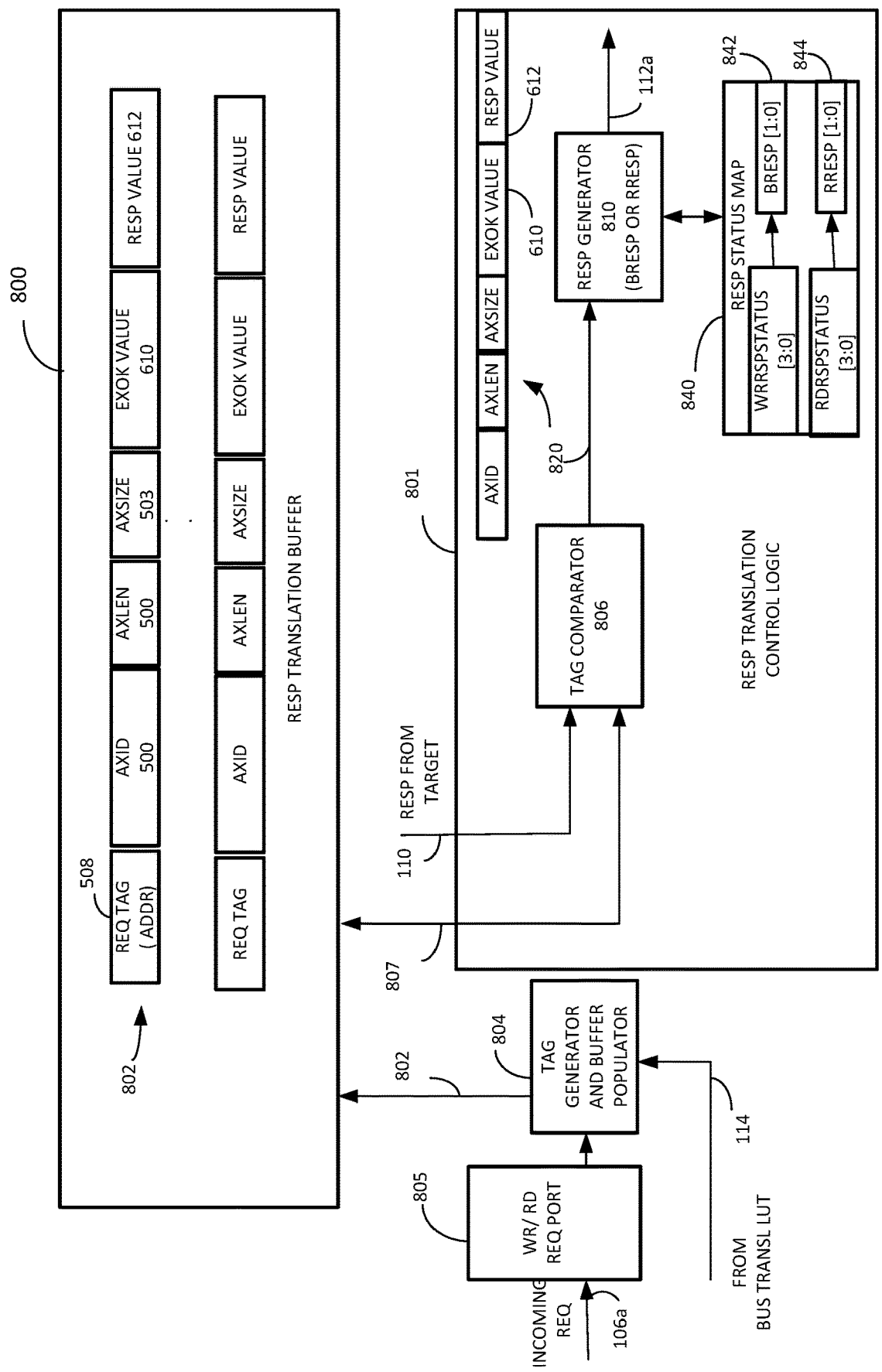
FIG. 8 illustrates a block diagram of another apparatus that translates transaction requests between a plurality of requesting units and at least one target unit in accordance with one example set forth in the disclosure.

Referring also to FIG. 8, in one implementation, the controller 107 includes a tag generator and buffer populator 804 which in one example is implemented as firmware executing in the controller or through hardware such as one or more state machines, and a response translation buffer 800, such as a first in first out (FIFO) buffer. The tag generator and buffer populator 804 receives the incoming request 106*a* from a read or write request port 805 and assigns the request tag 508 which is a next available entry 802 in the buffer 800. The request tag 508 is used to track the outgoing request 108 and corresponding returned response 110. As shown in block 708, the method includes storing at least a portion of the bus protocol translation data from the bus protocol translation LUT 114 corresponding to the incoming transaction request into the response translation buffer 800. In one example, the tag generator and buffer populator 804 also stores field data from the original request 106*a* such as data from fields 500, 502, 503, 504 and the response translation data from entries associated with fields 610 and 612 from the corresponding entry in the bus protocol translation LUT 114 into an entry 802 that is addressable by the request tag 508. The request tag 508 is used as the address in the response translation buffer when processing returned responses so that the controller need not access the LUT 114 while the controller is processing other incoming accessing for other transactions. This increases the speed of the translations by reducing access to the LUT 114 and decreases die area since there is no need for a dual port SRAM LUT configuration. In one implementation, the response translation buffer 800 includes a write request tag buffer and a read request tag buffer, however any suitable buffer configuration may be used. Where a write request tag buffer and read request tag buffer are used, the request tag is stored in the respective write request tag buffer or read request tag buffer depending upon whether the incoming transaction request is a read or write request.

For example, as shown in block 710 the method includes receiving a response 110 via the second bus protocol from the target unit. The target unit, in conformance with the second protocol, copies the request tag from the outgoing request 108 as a write or read response tag 530. A comparator 806 checks if the response tag 530 in the received response 110 matches with a request transaction tag stored in the response translation buffer 800 and when the response tag 530 is found in the response translation buffer, the comparator provides the corresponding information from the entry to a response generator 810 that generates and provides the translated response 112*a* to the requesting unit.

For example, the tag comparator 806, receives the response 110 from the target unit through a response channel and matches the transaction tag in the received response 110 with a transaction tag stored in the response translation buffer by performing a search operation shown as 807. For example, the comparator uses the response tag 530 as an address in the response translation buffer 800 and provides the read entry information to a response generator 810. As shown in block 712, the method includes generating the first protocol response 112*a* from the second protocol returned response 110. For example, the controller 107 translates the received response from the second protocol into a first protocol response using the entry information corresponding to the response tag 530 such as the bus protocol translation data and original field data stored in the buffer 800, based on matching the transaction tag. In one implementation, the tag comparator 806 (or the response generator 810) reads the data 820 from the entry in the response translation buffer and provides the data 820 to the response generator 810. The response generator 810 generates the translated response 112*a*. In this example, the response 112*a* is an AXI response such as either a write response 540 (BRESP) or a read response 542 (RRESP) that is generated from a second protocol write response 544 or a second protocol read response 546. In this example, when there is a "1" in either of the exok resp field 610 or the resp value field 612, depending upon whether the returned response 110 is a write response 544 or a read response 546 from the target unit, the wrrspstatus field 522 data or the rdrpsstatus field 524 data is used by the response generator 810 as an index in the response status map 840, stored in SRAM, to look up corresponding status data 842 and 844 to send in the response 112*a*. In one implementation, the response status map 840 serves as a type of rule that is also provided in firmware.

For example, in one example the received response 110 from the target unit includes four bits of write response data 522 or four bits of read response data 524 that indicates a status of the response according to the second protocol. In this example there are 16 different status indications that can be sent by the target unit. However, the first bus protocol of the requesting unit only allows 4 status indications so the response generator 810 uses stored mapping tables, such as the response status map 840 that are user defined by the manufacturer and stored in the memory 116 by the bus protocol translation code 120 The response generator reads a table entry identified by the value in fields 610 and 612 stored in the response translation buffer to convert the 16 second protocol status indications to the 4 first protocol status indications as defined by the response translation information from fields 610 and 612 stored in the response translation buffer 800. In one implementation, the response status map 840 that includes mapping tables (one for write responses and one for read responses) serve as mapping rules that are structured as configurable rule lookup tables stored as part of the bus protocol translation code that maps the 16 response status values to 4 response status values for both write and read responses. In this example, each mapping table includes data that is copied into the response or that indexes to the bus protocol look up table 114 or contains the data from the LUT 114. An example is shown below as Table I where, as an example, 4'h0 indicates 4 bits resulting in a hexadecimal value of 0 and 2'h0 indicates 2 bits resulting in a hexadecimal value of 0.

Figure 9:
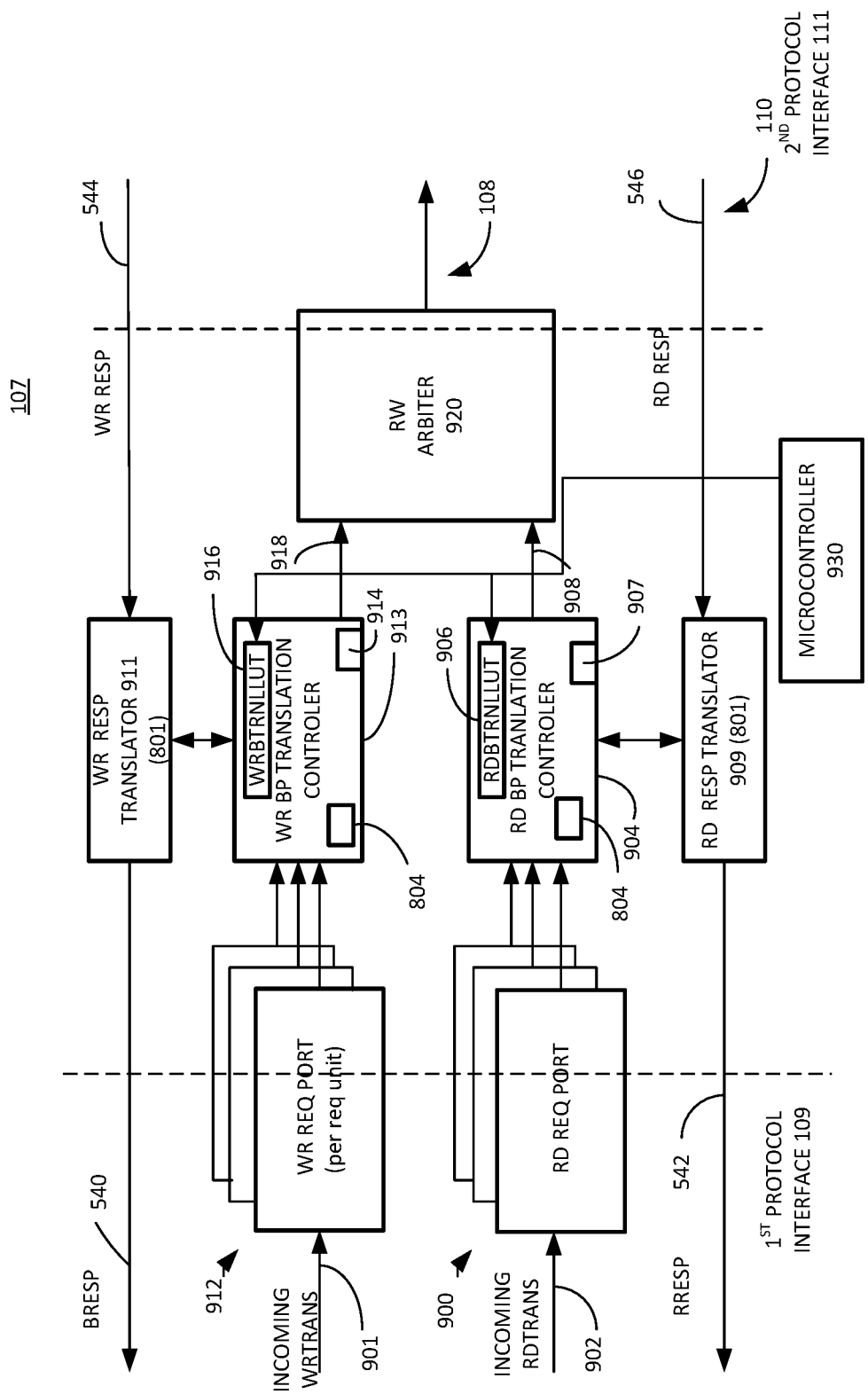
FIG. 9 illustrates a functional block diagram of a bus protocol translation controller that translates transaction requests between a plurality of requesting units and at least one target unit in accordance with one example set forth in the disclosure.

FIG. 9 illustrates a block diagram of an example of the controller 107 that translates transaction requests and responses between a plurality of requesting units and at least one target unit. The operation is similar to that describe above. The operation of the controller 107 is broken down into read and write functional blocks and the bus protocol translation LUT 114 is duplicated and referred to as a read bus protocol translation LUT 906 and a write bus protocol translation LUT 916. When the controller 107 receives read and write transaction requests in a same cycle, each single port SRAM table is read at a same time. However, any suitable structure may be employed. For example, a single table in SRAM that support two read ports could be also employed.

In this example, the first bus protocol interface 109 includes a plurality of read request ports 900 configured to receive incoming read transaction requests 902 via the first bus protocol as conventional input ports. The first bus protocol interface 109 also includes a plurality of write request ports 912 configured to receive incoming write transaction request via the first bus protocol as conventional input ports. The read and write request ports perform pre-translation of information in the requests by, for example, converting information formats from the first protocol to the second protocol. For example, the AXADDR information is converted to corresponding REQADDR information and likewise AXLEN information is converted to corresponding

TABLE I

| write response status OR read response status | Response type | AXI BRESP OR AXI RRESP |
| --- | --- | --- |
| 4'h0 | OKAY (Normal completion) | OK(2'h0) |
| 4'h1 | EXOKAY (Exclusive access completion) | EXOK_VALUE |
| 4'h2 | SLVERR (Target Abort) | SLVERR(2'h2) |
| 4'h3 | DECERR (Master Abort) | DECERR(2'h2) |
| 4'h4 | EARLY (Early Response) | RESP_VALUE |
| 4'h5 | OKAY_NODATA (Normal completion with no data) | RESP_VALUE |
| 4'h6 | PROTVIOL (Protection Violation) | RESP_VALUE |
| 4'h7 | TRANSERR (Transaction Error) | RESP_VALUE |
| 4'h8 | CMPTO (Completion Timeout) | SLVERR(2'h2) |
| 4'h9 | Reserved | RESP_VALUE |
| 4'ha | Reserved | RESP_VALUE |
| 4'hb | Reserved | RESP_VALUE |
| 4'hc | CRS (Configuration Request Retry) | RESP_VALUE |
| 4'hd | Reserved | RESP_VALUE |
| 4'he | Reserved | RESP_VALUE |
| 4'hf | Reserved | RESP_VALUE |

As shown, if the target returns a 4'h1, the response generator 810 uses the value from EXOK VALUE field 610 from the data 820 which is the data from bus protocol translation LUT 114. Likewise, when the target returns a 4'h4, the response generator 810 uses the value from the RESP VALUE field 612 from the data 820. As shown in block 714 the method includes the response generator 810 sending the response 112a to the first protocol request 106a to the corresponding requesting unit 104a through the first bus protocol interface 109.

In one example the comparator 806 and response generator 810 are also implemented as digital hardware logic circuitry, or as one or more state machines or other suitable structure. However, any suitable structure may be employed including but not limited to one or more state machines, field programmable gate arrays, suitable digital combinational circuitry and any suitable processor executing code configured to operate as described herein.

REQLEN information and AXCACHE information is converted to corresponding REQCMD information. However, any suitable functional block may perform this operation.

The bus protocol translation controller 107 includes a read bus protocol translation controller 904 configured to access a read bus protocol translation LUT 906 to produce an outgoing translated read request 908 for a corresponding incoming transaction request 902. The read bus protocol translation LUT 906 employees the same structure that is described above with reference to the bus protocol translation LUT 114. For example, the read bus protocol translation lookup table (LUT) 906 includes a table entry address that maps to a respective read requesting unit, each table entry address mapping to data representing at least read request bus protocol translation data used by the read bus protocol translation controller.

In one implementation, the read bus protocol translation controller 904 produces the outgoing translated read request 908 for the target unit by storing data from the incoming read transaction, such as data that does not need to be translated but that is needed in a response into a read response translation buffer 907 similar to the data stored in the response translation buffer described above. The read bus protocol translation controller 904 also copies bus protocol translation data from the read bus protocol translation LUT 906 into the response translation buffer 907, such as status data from fields 610 and 612, that corresponds to the requesting unit issuing the incoming read request. The read bus protocol translation controller 904 assigns the unique transaction tag to each outgoing read transaction request as discussed above. In this example, the response translation control logic 801 includes a read response translator 909 and a write response translator 911 that operate in a similar manner as described above with reference to the response translation control logic 801 except there is separate circuitry to process read and write requests.

For write request processing, a write bus protocol translation controller 913 produces an outgoing translated write request 918 for a corresponding incoming transaction request by storing data from the incoming write transaction into a response write translation buffer 914 in a similar manner as described above with respect to the response translation buffer 800 and copies bus protocol translation data, as set forth above, from the write bus protocol translation LUT 916 into the write response translation buffer 914 that corresponds to the requesting unit issuing the incoming write request. The write bus protocol translation controller 913 assigns a unique transaction tag to each outgoing write transaction request 918. Bus protocol translation controllers 913 and 904 read respective bus protocol translation LUTs 916 and 906 at a same time when write requests 901 and read requests 902 are received at the write request port 912 and read request port 900 at the same time. An arbiter 920 has inputs that receive the outgoing read and write transaction requests 908 and 918 and selects between them to provide the translated outgoing read request or translated outgoing write request to the target unit. In this example the controller 107 includes a programmable microcontroller 930 that executes the bus protocol translation code 120 to generate the bus protocol translation LUT 114. Also, the read and write bus protocol translation controllers, read and write response translation translators, arbiter and request ports are implemented in one example as hardware circuitry including digital logic circuitry that operates as described. The structure may also include one or more state machines, programmable controllers, field programmable gate arrays, DSPs, or any other suitable structure as desired.

Figure 10:
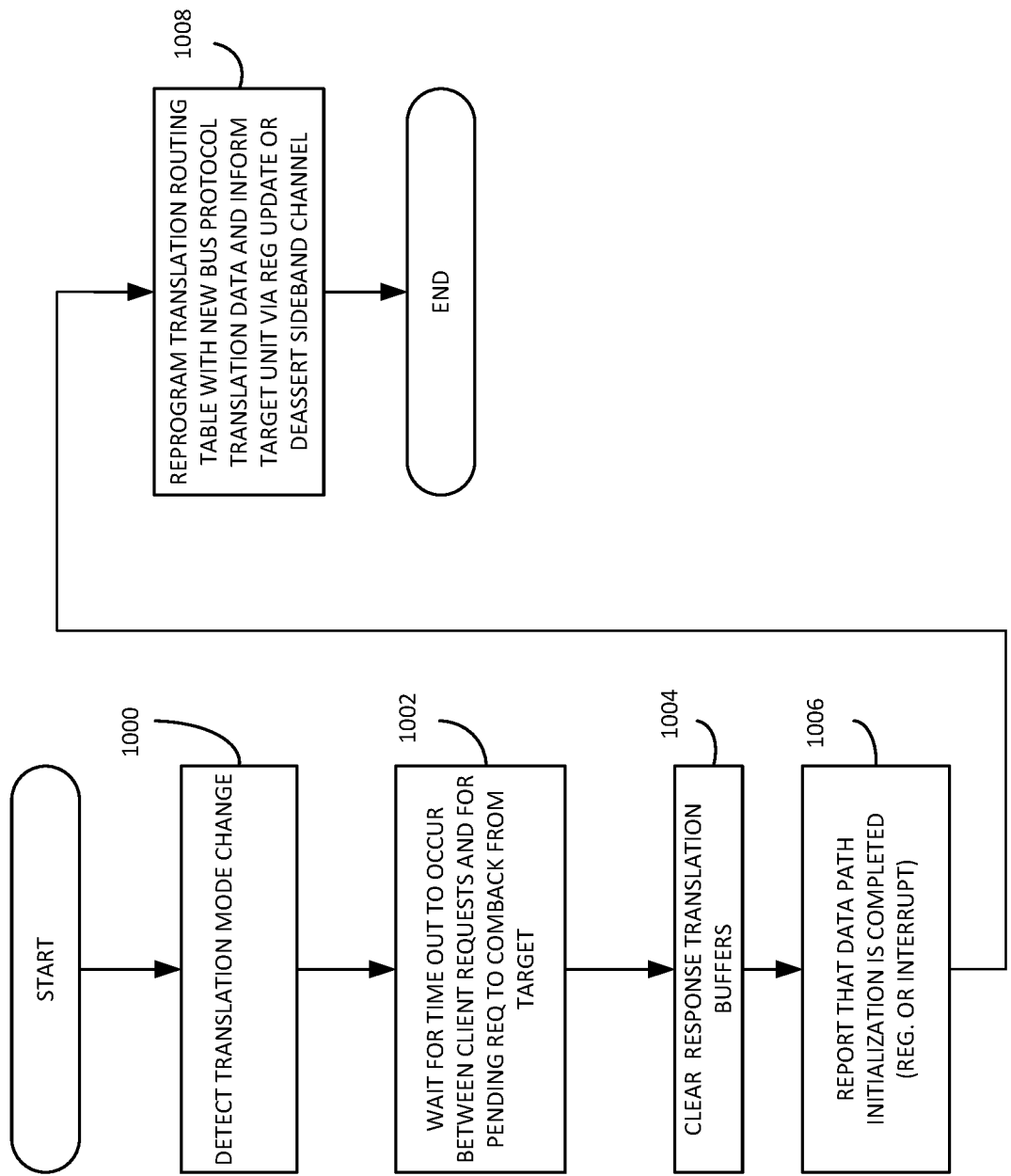
FIG. 10 is a flowchart illustrating another method for translating transaction requests between a plurality of requesting units and at least one target unit in accordance with one example set forth in the disclosure.

FIG. 10 is a flowchart illustrating a method for translating transaction requests between a plurality of requesting units and at least one target unit wherein the bus protocol translation controller reprograms the bus protocol translation LUT. For example, the controller provides a type of hot plug reconfiguration of the bus protocol translation table when a new client(s) is added to an AXI port, a new NIC is added, a new client is added to a NIC, or other remote clients are added or their configuration changes that would require a translation data change to the bus protocol translation LUT. In one example, this is done through downloading a new version of the firmware that contains the new lookup table data. In other implementations, the new lookup table data is provided by the new clients to the controller or is provided via a driver update or other software change. In one implementation reprogramming is done based on detecting a translation mode change event through a mode change register that is written to by an operating system, written by a new requesting unit that has been added to the system or written by any other suitable mechanism. In one implementation the bus protocol translation controller 107 is configured to carry out the method shown; however any suitable component(s) may be employed. In this example, as shown in block 1000 the method includes, detecting a translation mode change. For example, the controller is notified through a register write of the change event. In response to a requesting unit configuration change event, as shown in block 1002 the controller waits a timeout period and as shown in block 1004, clears the response translation buffers. As shown in block 1006, the controller reports to an OS, requesting clients or other function that the data path initialization is complete so that future communication is approved. As shown in block 1008, the method includes reprograming the bus protocol translation LUT 114 with updated bus protocol translation data from an updated version of firmware that includes the new table information, or reprogramming the table using information supplied from the new client, or other suitable source and issues a reprogram event acknowledgement, such as a write to the register or de-asserts a sideband channel (e.g., new requesting unit, OS or other originating component) to indicate that the bus protocol translation LUT is reprogrammed.

Among one or more technical benefits, in some implementations, a new structure for implementing bus protocol translations for transactions, such as AXI transactions, through interface logic circuitry is disclosed. The disclosed bus transaction translation structure uses a controller and one or more bus protocol translation lookup tables in memory such as SRAM. This structure brings large die area savings by replacing hardcoded translation structures used in conventional systems with, in some examples, an SRAM that allows reprogramming of a bus protocol translation lookup table to provide different client configurations for systems through bus transaction translations in the interface logic. This new structure increases power efficiency, provides reconfiguration to allow changes and flexibility to adding new clients without requiring new die layout changes and improves performance. In some implementations, there is no need to change die layout configurations or require additional die development verifications or re-synthesis when the functions of requesting clients change or in some implementation when additional requesting clients are added. The memory, such as SRAM to store the bus protocol translation mapping table, saves die area and allows easy assignment of more addresses or data fields in the mapping table to extend the mapping table size for more client configurations.

Memory, such as SRAM or other suitable memory, consumes much less power compared with static mapping structures used in conventional systems and provides programmability when new clients or client with new functions are added to the system. For example, as disclosed, adding new translation table IDs for new clients and/or their function allows for adding new clients to an existing AXI port and/or adding new cascaded NICs or remote IOMMUs to hookup more new AXI clients without changes to the RTL coding and netlist for the die.

Although features and elements are described above in particular combinations, each feature or element can be used alone without the other features and elements or in various combinations with or without other features and elements. The apparatus described herein in some implementations use software or firmware stored on a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs). The data stored on the non-transitory computer readable storage medium can then be used (i.e., executed) to implement various embodiments of the invention.

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. An apparatus for translating transaction requests comprising:
   memory comprising a bus protocol translation lookup table (LUT) that comprises bus protocol translation data and corresponding response bus protocol translation data corresponding to each of a plurality of requesting clients; and
   a bus protocol translation controller configured to:
      in response to a transaction request, read the bus protocol translation data from the bus protocol translation LUT based on a table entry address associated with at least one of the plurality of requesting clients and generate an outgoing translated transaction request based on the bus protocol translation data; and
      send the outgoing translated transaction request to at least one target unit using the corresponding response bus protocol translation data.

2. The apparatus of claim 1 wherein the bus protocol translation LUT comprises addressable entries comprising the bus protocol translation data and wherein an entry in the bus protocol translation LUT is indexed by the table entry address corresponding to each of a plurality of requesting units.

3. The apparatus of claim 1 wherein the bus protocol translation controller is configured to generate the outgoing translated transaction request to include a unique transaction tag that uniquely identifies the outgoing translated transaction request and include bus protocol translation data from the bus protocol translation LUT.

4. The apparatus of claim 1 wherein the bus protocol translation controller is configured to:
   in response to a requesting unit configuration change event:
      wait a timeout period and clear response translation buffers used to translate transaction requests;
      reprogram the bus protocol translation LUT with updated bus protocol translation data; and
      issue a reprogram event acknowledgement that the bus protocol translation LUT is reprogrammed.

5. The apparatus of claim 1 further comprising:
   a response translation buffer comprising an assigned unique transaction tag and at least a portion of the bus protocol translation data from the bus protocol translation LUT; and
   the bus protocol translation controller is configured to:
      translate a received response using the at least portion of bus protocol translation data stored in the response translation buffer based on matching a transaction tag in the response with the unique transaction tag stored in the response translation buffer; and
      send the translated received response to an associated requesting unit.

6. The apparatus of claim 3 wherein the bus protocol translation controller further comprises:
   a read bus protocol translation controller configured to produce an outgoing translated read request for a corresponding incoming transaction request based on bus protocol translation data from the bus protocol translation LUT; and
   a write bus protocol translation controller configured to produce an outgoing translated write request for a corresponding incoming transaction request based on bus protocol translation data from the bus protocol translation LUT; and
   an arbiter, operatively coupled to the write bus protocol translation controller and the read bus protocol translation controller, configured to select between a translated outgoing read request and a translated outgoing write request and output a selected translated request for the at least one target unit.

7. The apparatus of claim 2 wherein the bus protocol translation controller is configured to assign to the plurality of requesting units, the entry index address as a unique table address and program the bus protocol translation LUT with corresponding bus protocol translation data for each of a plurality of requesting units, wherein the bus protocol translation data corresponds to each of a plurality of requesting units for translating between an incoming transaction request sent via a first bus protocol to an outgoing translated transaction request sent via a second bus protocol for the at least one target unit.

8. A system comprising:
   a target processor;
   a plurality of requesting clients;
   memory comprising a bus protocol translation lookup table (LUT) that comprises data representing at least request bus protocol translation data and corresponding response bus protocol translation data corresponding to each of the plurality of requesting clients; and a bus protocol translation controller, operatively coupled to the target processor, to the plurality of requesting clients and to the memory, configured to:
- in response to receiving an incoming transaction request, read the bus protocol translation data from the bus protocol translation LUT based on a table entry address associated with at least one of the plurality of requesting clients and generate an outgoing translated transaction request based on the request bus protocol translation data;
- send the outgoing translated transaction request to the target processor; and
- return a response to the incoming transaction request using the corresponding response bus protocol translation data.

9. The system of claim 8 wherein the bus protocol translation controller is configured to:
- in response to the incoming transaction request, translate the incoming transaction request to the outgoing translated transaction request such that the outgoing translated transaction request includes a unique transaction tag that uniquely identifies the outgoing translated transaction request and includes request bus protocol translation data from the bus protocol translation LUT.

10. The system of claim 8 wherein the bus protocol translation controller is further configured to:
- in response to a requesting unit configuration change event:
  - wait a timeout period and clear response translation buffers used to translate transaction requests;
  - reprogram the bus protocol translation LUT with updated request bus protocol translation data and corresponding response bus protocol translation data; and
  - issue a reprogram event acknowledgement that the bus protocol translation LUT is reprogrammed.

11. The system of claim 8 further comprising:
- a response translation buffer comprising an assigned unique transaction tag associated with an incoming transaction request and at least a portion of the bus protocol translation data from the bus protocol translation LUT; and
- the bus protocol translation controller is configured to:
  - translate a received response using the at least portion of translation data stored in the response translation buffer based on matching a transaction tag in the response with the unique transaction tag stored in the response translation buffer; and
  - send the translated received response to an associated requesting unit.

12. The system of claim 11 wherein the bus protocol translation controller further comprises:
- a read bus protocol translation controller configured to produce an outgoing translated read request for a corresponding incoming transaction request based on bus protocol translation data from the bus protocol translation LUT; and
- a write bus protocol translation controller configured to produce an outgoing translated write request for a corresponding incoming transaction request based on bus protocol translation data from the bus protocol translation LUT; and
- an arbiter, operatively coupled to the write bus protocol translation controller and the read bus protocol translation controller, configured to select between a translated outgoing read request and a translated outgoing write request and output a selected translated request to a target unit.

13. The system of claim 8 wherein the bus protocol translation controller is configured to assign to the plurality of requesting clients, the table entry address as a unique table address and program the bus protocol translation LUT with the request bus protocol translation data and the corresponding response bus protocol translation data for each of the plurality of requesting clients.

14. The system of claim 8 further comprising a first protocol bus interface, a second protocol bus interface and wherein the bus protocol translation controller is configured to receive transaction requests from the plurality of requesting clients via the first bus protocol interface and send the outgoing translated transaction request for the target processor via the second bus protocol interface; and return the response to the incoming transaction request using the first protocol bus interface.

15. The system of claim 12 wherein the memory comprises:
- a read bus protocol translation lookup table (LUT) that comprises a table entry address that maps to a respective read requesting unit, each table entry address mapping to data representing at least read request bus protocol translation data used by the read bus protocol translation controller; and
- a write bus protocol translation lookup table that comprises a table entry address that maps to a respective write requesting unit, each table entry address mapping to data representing at least write request bus protocol translation data used by the write bus protocol translation controller.

16. A method for translating transaction requests comprising:
- translating between an incoming transaction request to an outgoing translated transaction request using a bus protocol translation lookup table (LUT) that comprises bus protocol translation data;
- generating the outgoing translated transaction request by translating the incoming transaction request using the bus protocol translation data; and
- sending the outgoing translated transaction request to a target unit.

17. The method of claim 16 comprising:
- in response to the incoming transaction request, translating the incoming transaction request to the outgoing translated transaction request using the bus protocol translation data, such that the outgoing translated transaction request includes a unique transaction tag that uniquely identifies the outgoing translated transaction request and includes bus protocol translation data from the bus protocol translation LUT.

18. The method of claim 16 further comprising:
- in response to a requesting unit configuration change event:
  - waiting a timeout period and clear response translation buffers used to translate transaction requests;
  - reprograming the bus protocol translation LUT with updated bus protocol translation data; and
  - issuing a reprogram event acknowledgement that the bus protocol translation LUT is reprogrammed.

19. The method of claim 16 further comprising:
- assigning a unique transaction tag to the outgoing translated transaction request based on the incoming transaction request;

translating a received response using a portion of bus protocol translation data stored in a response translation buffer based on matching a transaction tag in the received response with the unique transaction tag; and sending the translated received response to an associated requesting unit.

20. The method of claim 16 further comprising assigning to a plurality of requesting units, a unique table address entry and programming the bus protocol translation LUT with corresponding bus protocol translation data for each of the plurality of requesting units.

* * * * *